United States Patent
Orten et al.

(10) Patent No.: US 6,926,335 B2
(45) Date of Patent: Aug. 9, 2005

(54) METHOD AND DEVICE FOR PRODUCING A PROFILED TRIM SECTION FOR A GLASS PANE

(75) Inventors: Thomas Orten, Roetgen (DE); Thomas Bischof, Aachen (DE); Ulrich Behrend, Stolberg (DE)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/466,631

(22) PCT Filed: Jan. 23, 2002

(86) PCT No.: PCT/FR02/00276

§ 371 (c)(1),
(2), (4) Date: Feb. 9, 2004

(87) PCT Pub. No.: WO02/060713

PCT Pub. Date: Aug. 8, 2002

(65) Prior Publication Data

US 2004/0118079 A1 Jun. 24, 2004

(30) Foreign Application Priority Data

Jan. 30, 2001 (DE) .......................................... 101 03 865

(51) Int. Cl.⁷ ................................................ B32B 3/02
(52) U.S. Cl. ....................... 296/93; 428/412; 52/204.53
(58) Field of Search .............................. 52/208, 204.53, 52/204.591, 786.12, 204.593; 264/134, 264, 265; 428/34, 35.7, 412; 296/93

(56) References Cited

U.S. PATENT DOCUMENTS

| 4,916,873 A | * | 4/1990 | Keys ............................. 52/208 |
| 5,141,278 A | * | 8/1992 | Iwata et al. .................... 296/93 |
| 5,421,940 A | | 6/1995 | Cornils et al. |
| 5,603,546 A | * | 2/1997 | Desir, Sr. ........................ 296/93 |
| 5,908,595 A | | 6/1999 | Cornils et al. |
| 6,332,640 B1 | * | 12/2001 | Cornils et al. ................. 296/93 |
| 2002/0153743 A1 | | 10/2002 | Cornils et al. |

FOREIGN PATENT DOCUMENTS

| DE | 42 29 090 | 3/1994 |
| JP | 57-197139 | 12/1982 |
| JP | 63-162210 | 7/1988 |

* cited by examiner

Primary Examiner—Naoko Slack
(74) Attorney, Agent, or Firm—Oblon, Spivak, McClelland, Maier & Neustadt, P.C.

(57) ABSTRACT

A window having with a first surface, a second surface and an edge face is provided. A mould having an upper section and a moulding bed with a mould surface, which together form a mould channel into which a polymeric material can be introduced to form the trim, is also provided. At least a part of the window is inserted into the mould channel so that the perimeter of first window surface contacts the moulding bed and the window surface extends parallel to the mould surface. The polymeric material is introduced into the mould channel and the polymeric material adheres to the perimeter of the second surface of the window to provide a trim section which projects beyond the second surface and covers the edge face of the window, while preventing the adhesion of the trim section to the edge face of the window.

17 Claims, 3 Drawing Sheets

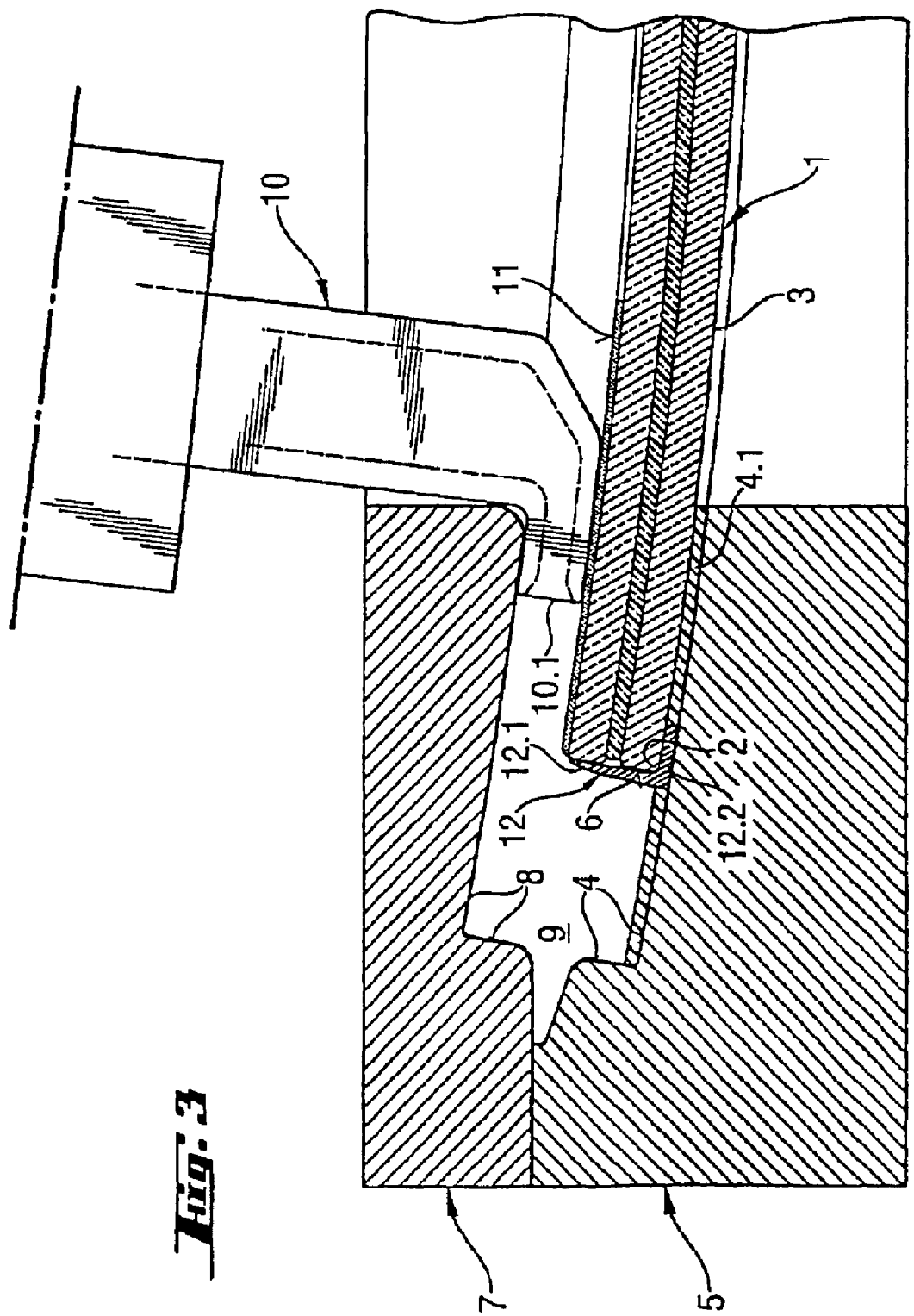

METHOD AND DEVICE FOR PRODUCING A PROFILED TRIM SECTION FOR A GLASS PANE

FIELD OF THE INVENTION

The invention relates to a process for manufacturing a trim on a window having the features indicated in the preamble of claim 1 and to the corresponding device having the features indicated in the preamble of the secondary claim 11.

BACKGROUND OF THE INVENTION

Document DE-C1-42 32 554 discloses a process having these generic features, in which a glass window rests, during application of the trim by the extrusion of a polymer material, on what is called a moulding bed. The latter is located in an edge region of the window on its lower surface and forms, on the perimeter face of the window, an extension of the lower surface of the window. During this time, the edge face and the opposite surface of the window remain free. The trim is formed as a surround along the edge of the free surface of the window. During this time, the edge face and the opposite surface of the window remain free. The trim is formed as a surround along the edge of the free surface of the window and around the edge of the window and it also covers the edge face of the window. Thanks to the moulding bed, the outline of the trim is bounded in a way that it extends level with the other surface (on the side of the moulding bed) of the window. The process is described in the case of monolithic glass windows.

It is also known (from document DE-A1-43 26 650) to fit by extrusion, onto a monolithic glass window, a trim which grips at least the edge of one of the surfaces of the window and its edge face. The trim comes level with the opposite surface of the window. In this process, the extrusion nozzle itself—or an extension placed on it, which is mechanically integral therewith—forms the boundary of the trim cross section on the window surface not covered by the trim. A stationary moulding bed is not necessary in this case.

In a preferred application, the trims are used for fitting windows into the correct position and for sealing them, the windows being adhesively bonded in the window openings of vehicle bodywork. It is not necessary for them, in all cases, to go around the entire perimeter of the windows they can also be provided along just three edges, in special cases along just two edges or even along just one edge and, if necessary, even along just parts of a single edge. These trims must, of course, adhere very strongly to the windows—which are usually made of glass but are also increasingly made of plastic. To guarantee this good adhesion, the substrates must be clean, free of grease, etc. Furthermore, they must usually be coated, in the corresponding regions, with adhesion promoters, also called primers. For each trim material, there is a corresponding primer. In the abovementioned publications, this is discussed exhaustively, the trim also having to adhere to the perimeter face, that is to say to the edge faces or thin edges of the windows.

It must be clearly understood that the process to be described here may be suitable not only for the furnishing of transparent windows with a trim but also used in the case of other substrates of the glazing kind.

Now, when composite glazing (by this is meant, in the case of vehicles, above all the front windows or windscreens, but also increasingly, the side windows or rear windows) formed from several solid panes made of glass and/or synthetic material and from adhesive (organic) interlayers have in particular to be provided with surrounding trims of this kind, blistering and/or debonds may occur when the adhesive layers are closed off to the outside by the trim which adheres thereto. This has been observed in particular in the case of the composite glazing used most often, which is composed of two glass panes and an adhesive layer made of polyvinyl butyral (PVB). In this case, blistering may form in the PVB after the trim has been applied to the composite glazing. Vehicle manufacturers wish above all to incorporate windscreens into the bodywork in as flush and as smooth a manner as possible, without an edge slot, so as to minimize wind resistance, wind noise and also susceptibility to contamination, and to achieve an aesthetically attractive appearance.

Again, a process has already been disclosed (in document DE-A1-42 29 090) in which, in glazing made of composite glass with a PVB adhesive layer, a peripheral edge slot is formed or left free in the plane of the adhesive layer, into which slot a trim with lips, made of a polymer, will be inserted later, so as to protrude from the peripheral edge of the composite glazing. For this purpose, the enveloping surfaces of the said edge slot are coated with an adhesion promoter. The polymer material is then extruded into the edge slot and beyond, in the form of a protruding neck, by means of a suitable gauged extrusion nozzle. However, this process has not proved itself in practice.

Document DE-A1-198 43 843 discloses a window with a trim having a particular cross section, which adheres only to one of the surfaces of this window while covering, however, a slot, with a partially cuneiform cross section, remaining free, in the mounted state, in a window opening of bodywork. This thus also results in a trim fitting approximately flush with the free surface of the window and in a smooth transition with the adjacent surface of the bodywork. In the case of use of this trim, it is necessary, however, during the mounting procedure, to pay greater attention, compared with the abovementioned trims produced by means of a moulding bed, so as to place the trim in the intended final position.

SUMMARY OF THE INVENTION

The fundamental objective of the invention is to provide a process for manufacturing a trim on a window, in particular on a composite window, by using a moulding bed, by virtue of which it is possible to exclude the reciprocal effects between the materials of the adhesive layers of the composite, on the one hand, and of the trim, on the other. Also proposed is a device suitable for carrying out the process and a composite window provided with a trim of this kind.

The objective is achieved, as regards the process according to the invention, by means of the features indicated in claim 1. The features indicated in claim 11 refer to a corresponding device suitable for carrying out the process described here according to the invention. The features indicated in the secondary claims, subordinated each time to the independent claims, refer to advantageous improvements to the process or to the device.

Generally speaking, agents are used to prevent adhesion of the polymer material to the edge face of the windows, this edge face remaining capable of being ventilated. In particular, when applying the trim to composite windows, any direct adhering contact between the polymer material and the composite adhesive layer or layers is prevented. This ventilation is necessary, above all, when using hygroscopic PVB as the adhesive layer. The process, independently of the foregoing, can of course be used without more ado should it be necessary, both for monolithic glazing and for other substrates.

It is preferred to use, as polymer material, thermoplastic polymers such as polyolefins, vinyl polymers and styrene polymers, it also being possible, however, for the process to be used sensibly with other polymer materials, such as, for example, with thermoplastic polycondensates.

A preferred way of preventing the adhesion consists, firstly, in applying no adhesion promoter to those edge faces of the window that are to be provided with the trim or in removing it again. Because these edge faces are, as a general rule, polished so as to be smooth, this already results, without any primer treatment, if the worst comes to the worst, in poor adhesion of the polymer material to this surface, which can be easily detached, if necessary, during the subsequent mounting of the window in bodywork. Measures of this kind would not apparently be taken within the context of the prior art of this kind mentioned at the beginning.

Before the polymer material is applied, the said edge faces could also be coated with an adherent release agent which must similarly be compatible with the material of the window pane or panes, with the material of the adhesive layers and with the polymer of the trim. If the trim is provided for subsequent application of an adhesive, by means of which the finished window is adhesively bonded to vehicle bodywork, the mounting adhesive must adhere impeccably to the polymer material. It would be possible to use, as release agents, for example, mineral waxes, chalk, mica, metal stearates or polyethylene glycol. Silicones are also effective as a release agent, but they have negative properties (migration, surface seating and difficulty of removal) specifically as regards the direct bonding mentioned, which means that they can be used only to a limited extent for the applications involved here.

In a particularly preferred method of implementation, the polymer material is prevented from adhering to the edge face of the window by using a mask in the form of a tape, band or strip, which is placed over the corresponding edge face section, during production of the trim, and which is pulled off or removed therefrom after it has solidified.

Within the overall operation of manufacturing the trim or the window which is provided with it, the edge face of the window, before or after it is placed on the moulding bed, is provided, in accordance with one method of implementing the process, with a mask whose width or height corresponds at the very least to the thickness of the glass. The window or the surface opposite the moulding bed is then cleaned, in a known manner, and, on the edge side, in the region covered by the polymer trim, is coated with an adhesion promoter/primer, the said mask preventing the edge face from being wetted by the primer. The trim is now applied, for example by direct spraying or extrusion. Once the polymer material has become solid, the mask is removed.

The width of the mask mentioned has to be chosen so that it can be gripped and pulled off, by hand or automatically, by the end which projects therefrom, when it still remains on the window after the latter has been lifted out of the moulding bed. In another method of implementation, the mask is linked to the moulding bed in such a way that the window can be lifted out of the moulding bed, after manufacture/solidification of the trim, the mask remaining in place in the moulding bed.

The surface for contact between the mask and the trim of the window must, of course, be made in such a way that it provides a sealing effect with respect to the primer. Pressing this contact surface (sealing surface) flush is particularly necessary when there is a misalignment between the individual panes of a composite window. The mask must then bear, in a sufficiently sealed manner, on the edge face of the individual (free) pane lying at the top. It is of considerable importance for the adhesive layer of the composite window not to come into (sealed) contact with the polymer material and also for ventilation to be able to take place from the exterior side of the mounted window. It is not, of course, absolutely necessary to keep the edge face (directed in the mounted state towards the passenger compartment) of the window, removed from the moulding bed, free over the entire width of the polymer material.

Preferably, the mask can be reused several times. Furthermore, it is temperature resistant, in particular resistant to the activation temperatures needed for applying the primer.

The seating surface (on the window side) mentioned above and the contact surface (facing the polymer surround), on the other side, of the mask may both have a surface structure, for example fine grooving perpendicular to the longitudinal extension of the trim. This grooving makes it easier to remove the mask with as little friction as possible after the trim has been manufactured, without damaging the trim or the window. When the cross section of the mask has a slightly wedged shape, this also makes it easier for it to be detached from the (air) slot formed between the edge faces of the window and the finished trim.

One part of the mask, which protrudes as a gripping tab for removing it, may project parallel to the edge of the glass, perpendicular to the moulding bed. Tabs of this kind absolutely must not extend over the entire length of the mask, but may be provided only in sections as "gripping handles". They may be made, for example, in so weak a manner that they let themselves be inverted, without any force being exerted, when the window provided with the mask is placed on the moulding bed. However, it is preferably necessary to provide an angled strip as the mask, which is angled inwards or outwards, at approximately a right angle in the manner of a flange. A T-shaped cross section of the angled strip is also possible, the actual mask being formed from the stem of the T.

If the region which extends towards the outside (starting from the window) is angled, it may be used, be suitably profiled, as a moulding element for the profiled surround. If the region which projects is angled inwards, it immediately forms, advantageously, the bearing surface for the edge located at the bottom of the window placed in the moulding bed.

It is possible to use, as the mask, a thin flexible band which is fastened to the window by suitable means, for example by a temporary, releasable, bond. Just as with the application of the polymer material, this procedure may be mechanized. If the mask has to cover the entire perimeter of the window, it may be stretched over the edge face all around the perimeter, if necessary, as a flexible band, provided that the edge of the window does not have too complex a design of perimeter (radii of curvature, shrinkage points, recesses).

In another method of implementation, it is possible to use, as mask, a rigid or flexible strip linked directly to the moulding bed, which matches the shape of the corresponding edge face of the window, as soon as the latter is placed in the moulding bed. This strip may also be produced, for example, as a thin elastic lip made of a sufficiently strong material. A strip mask positioned so as to be fixed in the moulding bed must be produced so as to correspond, however, very precisely to the perimeter outline of the window to be fitted and must be able to compensate for the inevitable variations in the dimensions of the surfaces of the windows in a manufacturing run, so that no slot, or at the very least so that only a minimal slot, appears between the mask and the edge face to be covered.

The moulding bed and its moulding surface in contact with the surface of the window may be covered, in a known manner, with a layer made of an elastically deformable material. This serves as a buffer between the surfaces of the window and the moulding bed, which is usually made of metal. Among other things, it matches the surface of the window and makes it possible to achieve a good seal with the moulding bed in the region of contact with the edge of the window. It would also now be possible to manufacture the mask from this elastic material and, if necessary, it could be made as a single piece with the elastic layer present in any case, the mask having to be made as a strip projecting from the layer.

It would also be possible, by suitable means, to produce a mask which would be placed in the moulding bed only after the window had been installed and positioned along the edge to be covered and which would, if necessary, be adhesively bonded to the latter. It is necessary to start from the principle that, after the window has necessarily been fixed in the moulding bed, no excessively high force acts on the mask, even during extrusion or application of the profiled surround, which is carried out virtually without any pressure. If necessary, this mask may also adhere slightly to the edge face of the window itself, provided that the window can again be easily removed after the profited surround has been manufactured.

Although a window placed in the moulding bed has been described here, the process may also be carried out in an equivalent manner in an inclined or vertical position on windows pressed against a moulding bed.

The cross section of the profiled surround to be formed must also be precisely defined on the opposite side from the moulding bed. The relevant prior art, discussed at the beginning, discloses various options with a view to forming a moulding channel for the profiled cross section. Use is made, in part, of a fixed upper mould. However, it is also possible, doing away with a fixed upper mould, to prescribe, directly by means of the outline of the exit edges of a gauged extrusion nozzle, the cross-sectional shape of the profiled surround on the opposite side from the fixed moulding bed. For implementation of the process mentioned here and for the corresponding device, all embodiments of the moulding channel which are disclosed therein may be taken into account. If necessary, additional suitable moulds, in particular solid moulds, may be used for injecting the polymer material. They are included in the disclosure of that application. It should be understood that measures are to be taken to prevent any adhesion of the polymer material to one of the fixed moulds.

An attractive aspect from the standpoint of the style of the profiled surround may be obtained, according to an improvement to the process, by using a coloured polymer material, the colour of which is matched to the structural environment of the window, for example to a colour of the bodywork in which the window is to be incorporated after the profiled surround has been produced. As a result, the relatively wide profiled surround fits in harmoniously, from the colour standpoint, with its surroundings.

Further details and advantages of the subject of the invention will become apparent from the drawing of the illustrative examples and from their detailed description which follows. The details of the process and of the device with regard to the primer and the manner of feeding and applying the polymer material for moulding the profiled surround are of little importance here. Again, on this subject, the reader may refer to the detailed prior art mentioned at the beginning.

DETAILED DESCRIPTION OF THE INVENTION

Figure 1:
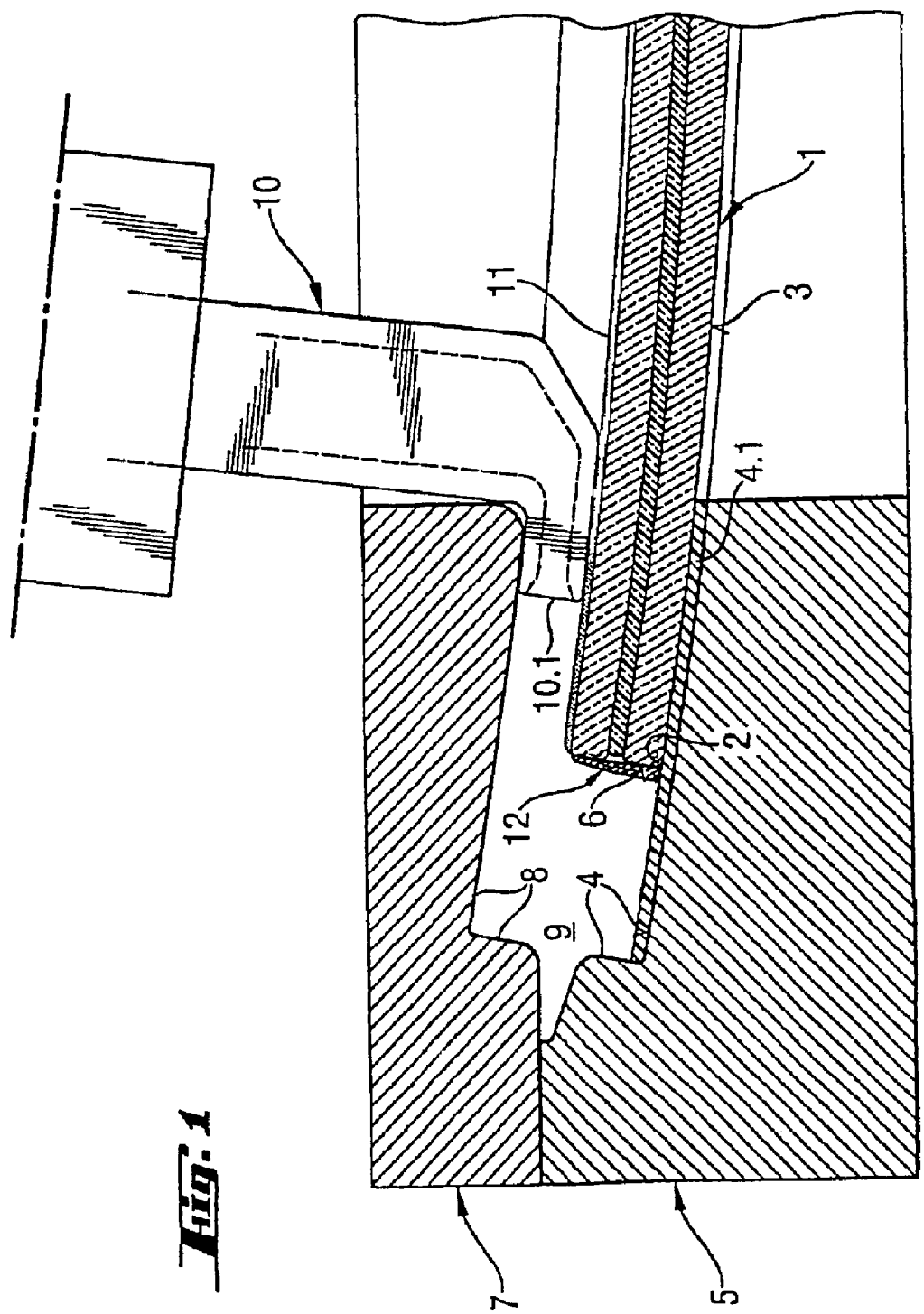
in FIG. 1, a sectional view of the marginal region of a window placed on a moulding bed of an extruder, the edge face of the window, projecting from the moulding bed, being covered with a mask in the form of a band.

As shown in FIG. 1, a window 1, produced as a composite window, rests with one edge 2 of its lower surface 3 on a mould surface 4 of a moulding bed 5, so that its edge face 6 projects from the mould surface. That region of the mould surface 4 which is in contact with the window 1 is provided, in a known manner, with a relatively thin buffer layer 4.1 made of an elastically deformable material. The moulding bed 5 thus forms, in a manner known per se, where appropriate, a peripheral bearing surface for the window 1 and at the same time an extension of the surface of the window 1 beyond its perimeter. It should be understood that the window 1 may also be positioned and fixed by suitable means to a non-peripheral moulding bed when, for example, a profiled surround has to be manufactured only over a partial perimeter sector of the window 1.

The convex surface of the window, which bears on the moulding bed 5, faces the outside when the window is mounted in vehicle bodywork.

Placed above the moulding bed 5 is an upper mould 7, which can be dismantled and removed, having a mould countersurface 8. On one side, it immediately adjoins the mould surface 4 of the moulding bed, as part of the overall split mould while, on the other side, extending inwards as far as beyond the edge of the window 1. The mould surface 4, the mould countersurface 8 and the edge face 6 together define, also in a known manner, an open moulding channel 9 for the purpose of manufacturing, by extrusion, a profited surround made of a polymer material.

The latter is introduced, in the present case, into the opening of the moulding channel by means of a gauged extrusion nozzle 10, which is only partly indicated, so that the said polymer material can adhere, over a relatively thin band of the edge side, at the very least to that surface of the individual pane placed at the top, on the opposite side from the moulding bed. This surface, has been provided with a primer, indicated as the thin layer 11, for the purpose of improving the adhesion. The primer may be applied directly to the material of the window or, as the case may be, in a known manner to the usual opaque decorative rim of the window.

The walls of the moulding channel 9 define, together with the mouth edges 10.1 of the extrusion nozzle 10, the set cross section of the said profiled surround which is applied to the window 1 over its entire perimeter or over just part of it. In the longitudinal extension of the profited surround, variations in its cross section may furthermore be made in the case of a corresponding embodiment of the mould surfaces and, where appropriate, in the case of corresponding control of the flow of material coming from the nozzle or of its rate of advance. The mouth edges 10.1 of the extrusion nozzle may, of course, also be shaped differently, as is described in the prior art.

As is apparent from the drawing, the mould surface 4 constitutes a "smooth" extension of that surface of the window 1 placed above it. The smooth transition of the window surface consequently also exactly, without any break, meets that surface of the profiled surround which, in the mounted state, faces outwards. However, it is of course also possible to manufacture, in this transition region, depending on the stylistic and/or technical requirements, transitions "with a break" and transitions of other designs and, if necessary, even ones with steps. In all cases, that surface of the corresponding profiled surround which is formed by the moulding bed 5, or alternatively by the mould surfaces 4/4.1, must be regarded as representing an extension of the surface 3 of the window 1.

Figure 2:
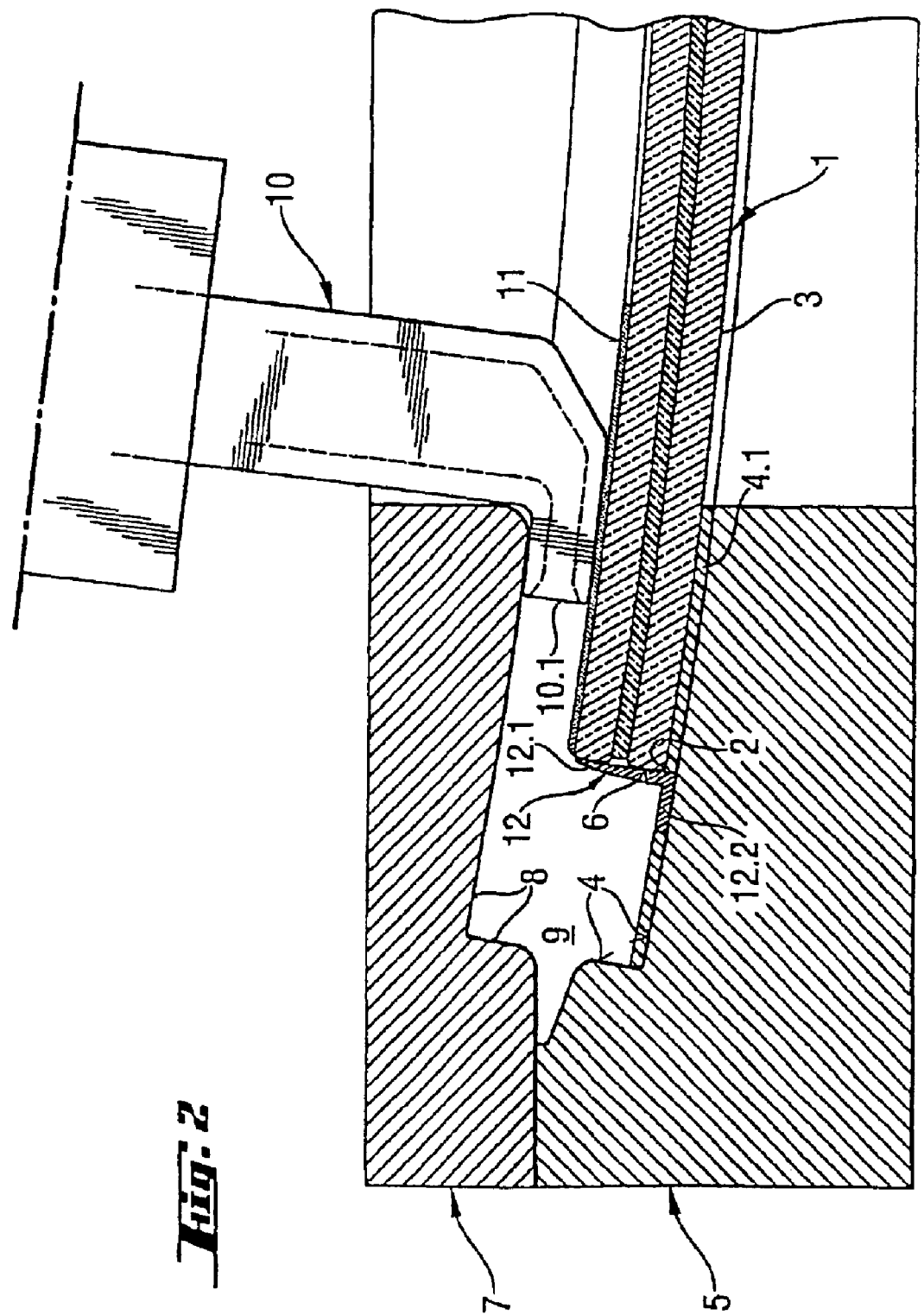
in FIG. 2, a detailed representation of the region of the edge of the window illustrated in FIG. 1, covered with a mask, in an additional embodiment of the mask; and in FIG. 3, an additional detailed representation, similar to FIG. 2, of yet another embodiment of the mask.

The edge face 6 of the window 1 is, in the present case, provided with a mask 12 in the form of a strip or band as thin as possible fitted so as to extend freely, the said mask preventing not only application of the adhesion promoter to the edge face 6 but also contact between the polymer material (yet to be applied and not indicated solely for the purpose of clarity) of the profiled surround and of the same edge face 6. FIGS. 2 and 3 provide, for the purpose of further elucidation, detailed representations of other embodiments of the mask 12 on the edge face 6.

The cross section in FIG. 2 explains that the mask 12 is produced as an angled strip, one side 12.1 of which constitutes the actual mask and the other side 12.2 of which is placed on the moulding bed 5. The mask side 12.1 bears, by means of a kind of sealing lip, on the edge face of the individual pane located at the top of the composite window 1. It is not absolutely necessary, as was already mentioned earlier, to keep free of polymer material the complete edge face of the pane located at the top (in the mounted state, facing towards the passenger compartment). Again it will be seen that the cross section of the side 12.1 used as the mask has a slight cuneiform shape, especially thinning down in the direction from the moulding bed towards the free end (at the top). As a result, the removal of this side from between the profiled surround (when solidified) and the window 1 is also simplified.

The second side 12.2 of the angled strip is angled in this case in the manner of a flange in the opposite direction from the window 1 so that its upper face also forms a partial section of the wall of the moulding channel 9. In the present case, this upper face is flush with the mould surface 4 of the moulding bed 5, more specifically with the layer 4.1 made of elastic material. However, it could also slightly protrude therefrom and consequently form, in the profiled surround, a flat groove along its line of contact with the edge face 6 of the window 1. It is possible to provide between the edge face 6 and the mask 12, in all embodiments, an adhesive bond, which can be released, in order to guarantee that the mask bears on the edge face during manufacture of the profiled surround. It is also possible to provide a releasable adhesive bond between the side 12.2 and the mould surface 4.

In the detailed representation shown in FIG. 3, the second side 12.2 of the angled strip is angled towards the window 1 in such a way that the edge of the window bears on the upper face of this side. Excluding the thin side 12.1 forming the mask, the moulding channel is consequently bounded only by the mould surfaces 4/4.1 and 8. The second side 12.2 is incorporated, again, into the layer 4.1 so as to be flush therewith. In this way, the profiled surround, or alternatively its surface formed by the moulding bed, meeting the surface 3 of the window, is prevented from forming a step with the surface of the window.

In all the methods of implementation, the polymer material may be introduced into the moulding channel 9 by means of an extrusion nozzle, preferably controlled by a robot, according to the correct way of positioning the window 1 and the mask 12, so that its cross section can be completely filled with the polymer material.

After the profiled surround has been manufactured and has solidified and the upper mould 7 has been removed, the window 1 can be lifted out of the moulding bed 5, the mask 12 being at the same time removed from the slot formed. Adhesion of the profiled surround, or of the polymer material with which it is made, to the edge face of the composite window is thus reliably prevented. It is possible, independently of the foregoing, to press the profiled surround, if necessary, with elastic deformation, loosely against the edge face 6 of the window 1 and completely close off, from the visual standpoint, the slot which is, in any case, very narrow. This will therefore be, in particular, the case in the mounted state, when the profited surround (as indicated in the drawings) is provided with a protruding lip which, in the bodywork, rests, providing sealing and centering, on a flange of a window opening and which consequently exerts, on the profiled surround, a certain compressive force directed towards the window.

Instead of the extrusion nozzle, it is also possible to use, for the purpose of feeding the polymer material into the moulding channel, a spray device when the moulding channel is closed in the region of the upper face of the window 1, apart from the feed orifices for the polymer material. As far as the mask and the means of protecting the edge face of the window from adhering to the polymer material are concerned, this results in no substantial modification.

What is claimed is:

1. A process for manufacturing a polymeric trim section on a window, comprising:
   i) providing a window having a first surface with a first perimeter, a second surface with a second perimeter, and an edge face;
   ii) providing a mould comprising (a) an upper section and (b) a moulding bed with a mould surface which together form a mould channel into which a polymeric material can be introduced to form the trim;
   iii) inserting at least part of the window into the mould channel such that the first perimeter of the window contacts the moulding bed and the first surface of the window extends parallel to the mould surface;
   iv) introducing the polymeric material into the mould channel and adhering the polymeric material to the second perimeter of the second surface of the window to provide a trim section that projects beyond the second perimeter and covers the edge face of the window; and
   v) preventing adhesion of the trim section to the edge face of the window wherein steps i)–v) are carried out prior to subsequent pressing of the polymeric trim section in the mounted state.

2. The process of claim 1, further comprising coating the second perimeter of the second surface of the window with an adhesion promoter.

3. The process of claim 2, further comprising
preventing the edge face of the window from being coated with the adhesion promoter.

4. The process of claim 1, wherein the polymeric material is introduced into the moulding channel with an extrusion nozzle.

5. The process of claim 4, wherein the extrusion nozzle is a gauged extrusion nozzle.

6. process of claim 1, wherein the polymeric material is a thermoplastic polymer.

7. A process for manufacturing a polymeric trim section on a window, comprising:
providing a window having a first surface with a first perimeter, a second surface with a second perimeter, and an edge face;
coating the second perimeter of the second surface of the window with an adhesion promoter;
preventing the edge face of the window from being coated with the adhesion promoter;
providing a mould comprising (a) an upper section and (b) a moulding bed with a mould surface which together form a mould channel into which a polymeric material can be introduced to form the trim;
inserting at least part of the window into the mould channel such that the first perimeter of the window contacts the moulding bed and the first surface of the window extends parallel to the mould surface;
introducing the polymeric material into the mould channel and adhering the polymeric material to the second perimeter of the second surface of the window to provide a trim section that projects beyond the second perimeter and covers the edge face of the window; and
preventing adhesion of the trim section to the edge face of the window;
wherein preventing the edge face of the window from being coated with the adhesion promoter is accomplished by coating the edge face of the window with a release agent.

8. A process for manufacturing a polymeric trim section on a window, comprising:
providing a window having a first surface with a first perimeter, a second surface with a second perimeter, and an edge face;
coating the second perimeter of the second surface of the window with an adhesion promoter;
preventing the edge face of the window from being coated with the adhesion promoter;
providing a mould comprising (a) an upper section and (b) a moulding bed with a mould surface which together form a mould channel into which a polymeric material can be introduced to form the trim;
inserting at least part of the window into the mould channel such that the first perimeter of the window contacts the moulding bed and the first surface of the window extends parallel to the mould surface;
introducing the polymeric material into the mould channel and adhering the polymeric material to the second perimeter of the second surface of the window to provide a trim section that projects beyond the second perimeter and covers the edge face of the window; and
preventing adhesion of the trim section to the edge face of the window;
wherein preventing the edge face of the window from being coated with the adhesion promoter is accomplished by placing a mask on the edge face of the window before the polymeric material is applied to the second surface of the window.

9. The process of claim 8, wherein the mask is fastened to the edge face of the window or to the moulding bed.

10. The process of claim 9, wherein the mask is a thin flexible band.

11. The process of claim 8, wherein the mask is an angled strip having a first side that contacts the edge face and a second side that contacts the moulding bed.

12. The process of claim 11, wherein the second side of the angled strip is part of the moulding surface, projects away from the edge face of the window, and is parallel to the molding bed.

13. The process of claim 11, wherein the second side of the angled strip contacts the first perimeter of the window and supports the first perimeter of the window.

14. An apparatus for providing a trim section on a window, wherein the window comprises a first surface with a first perimeter, a second surface with a second perimeter, and an edge face; said apparatus comprising:
1) a mould comprising (a) an upper section and (b) a moulding bed with a mould surface which together form a mould channel, and (c) a mask such that when a window is inserted in the mould channel the edge face of the window contacts the mask;
2) an extruding device for introducing a polymeric material into the mould channel such that the polymeric material adheres to the second surface of the window and the mask prevents the polymeric material from adhering to the edge face of the window.

15. The apparatus of claim 14, wherein the mask forms a band around the edge face of the window.

16. The apparatus of claim 14, wherein the mask is an angled strip having a first side that contacts the edge and a second side that is part of the mould surface.

17. The apparatus of claim 16, wherein the mask has a cross section with a cuneiform shape.

* * * * *